Figure 1:
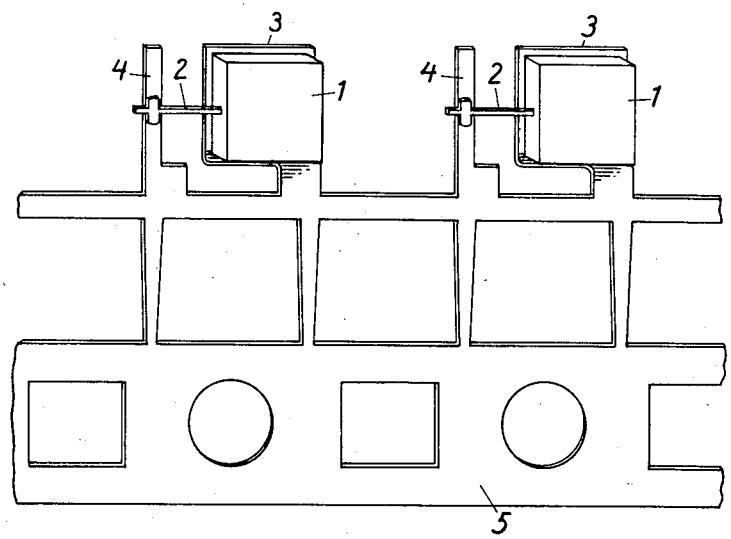

United States Patent [19]

Sternbeck

[11] 3,997,821

[45] Dec. 14, 1976

[54] SOLID ELECTROLYTIC CAPACITOR WITH PLANAR CATHODE LEAD

[75] Inventor: Olaf Sternbeck, Bromma, Sweden

[73] Assignee: Telefonaktiebolaget L M Ericsson, Stockholm, Sweden

[22] Filed: May 19, 1975

[21] Appl. No.: 578,818

Related U.S. Application Data

[63] Continuation of Ser. No. 429,950, Jan. 2, 1974, abandoned.

[52] U.S. Cl. .............................. 317/230; 317/242; 29/570
[51] Int. Cl.² ..................... H01G 9/00; H01G 9/16; B01J 17/00
[58] Field of Search .............. 317/230, 242; 29/570

[56] References Cited
UNITED STATES PATENTS

| | | |
|---|---|---|
| 3,343,051 | 9/1967 | Blank ........................... 317/242 |
| 3,516,150 | 6/1970 | Leech ........................... 317/230 |
| 3,588,628 | 6/1971 | Peck ............................. 317/242 |
| 3,611,054 | 10/1971 | Piper ............................. 317/230 |
| 3,646,404 | 2/1972 | Matsuo et al. .................. 317/230 |

Primary Examiner—Andrew J. James
Attorney, Agent, or Firm—Hane, Baxley & Spiecens

[57] ABSTRACT

The invention refers to a solid electrolytic capacitor, the anode and cathode leads of which are in known manner formed from a metal strip while the electrolytic capacitor per se comprises a metallic anode body which has a relatively large plane surface above which a dielectric layer and a cathode layer are stacked in that order. The cathode lead is a part formed from the metal strip and shaped as a plate having a surface that is at least as large as the plane surface of the anode body and faces the cathode layer.

1 Claim, 5 Drawing Figures

SOLID ELECTROLYTIC CAPACITOR WITH PLANAR CATHODE LEAD

This is a continuation of application Ser. No. 429,950, filed Jan. 2, 1974 and now abandoned.

The invention refers to a solid electrolytic capacitor, the anode and cathode leads of which are in known manner formed from a metal strip.

In solid electrolytic capacitors the anode is usually produced from tantalum powder sintered into a cylindrical body in which a tantalum lead is embedded to constitute an anode electrode. The anode body is electrically oxidized to form a dielectric layer and is thereafter impregnated with, for example, manganese nitrate which is pyrolytically converted to manganese dioxide to form a semiconducting layer which is provided with a cathode electrode by applying a further layer of silver lac.

A conventional procedure for producing an anode lead is to weld a solderable lead to the tantalum lead while a cathode lead is produced by welding or bonding with conductive silver lac a likewise solderable lead to the silver lac of the cathode electrode. This procedure is simple and unexpensive but has the drawback that the contact surface between the cathode lead and the cathode electrode becomes small resulting in a high and eventually unstable series resistance. Attempts to increase the contact surface by for example welding an extra plate to the cathode lead complicates the fabrication and increases the costs.

A cathode lead can also be produced by mounting the electrolytic capacitor in a metal casing to which an electrical contact is obtained by means of welding or applying silver lac. In this case a solderable lead is welded to the metal casing. This procedure in neither simple nor unexpensive and is in resemblance to the earlier described procedures difficult to carry out by automatic machining.

According to a later developed procedure described in the U.S. Pat. No. 3,646,404 the anode and cathode leads of the electrolytic capacitor are formed by punching or etching a solderable metal strip. This procedure is especially intended for automatic machining but the contact surface between the cathode lead and the cathode electrode is small which results in a high series resistance. Furthermore, the punching or etching of the metal strip must be adjusted to new dimensions when the size of the capacitor is changed which is a drawback in the fabrication.

Figure 2:
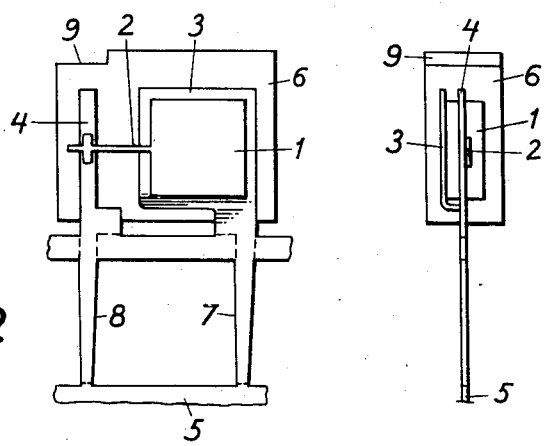
Figure 3:
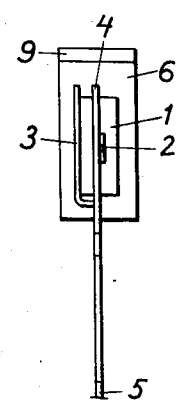
Figure 4:
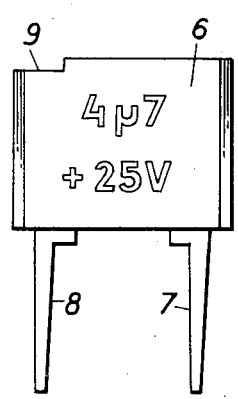
Figure 5:
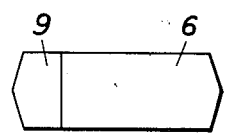

The invention refers to a dry electrolytic capacitor in which the series resistance between the cathode lead and the cathode electrode is low and the anode and cathode leads are formed from a metal strip without any adjustment to new dimensions when the size of the capacitor is changed. The invention is characterized as it appears from the appended claims and will be described more in detail in connection with the accompanying drawing in which FIG. 1 shows a perspective view of the electrolytic capacitor according to the invention in a production phase just before encapsulation; FIGS. 2 and 3 show a schematic front view and side view respectively of the electrolytic capacitor in FIG. 1 after encapsulation, and FIGS. 4 and 5 shows a front view and a top view respectively of the completed electrolytic capacitor.

FIG. 1 shows a perspective view of the solid electrolytic capacitor according to the invention in a production phase just before encapsulation. A capacitor element 1 has an anode electrode consisting of a tantalum lead 2 which is sintered into a rectangular anode body of sintered tantalum powder. The surface of the anode body is in known manner electrolytically covered with a dielectric layer of oxide, a semiconducting layer of manganese dioxide being pyrolytically obtained from manganese nitrate and on top of this a conductive silver lac layer constituting the cathode electrode.

One surface of the capacitor element 1, that is plane as the underlying surface of the rectangular anode body, and the tantalum lead 2 are attached by means of a drop of silver lac to a plate 3 and by welding to a tab 4 respectively of a copper strip 5 which is advanced step by step during the production process. A new capacitor element 1 is attached to the copper strip 5 each time it is advanced one step. The plate 3 is displaced laterally by bending it so that the tab 4 will receive the tantalum lead 2 in the appropriate position for welding.

FIGS. 2 and 3 show a schematic front view and side view respectively of the electrolytic capacitor in FIG. 1 after encapsulation in a plastic casing 6. The broken lines of the copper strip 5 mark where this will be punched to separate the electrolytic capacitor and produce the leads 7 and 8 to the anode and cathode of the capacitor element through the plate 3 and the tab 4 respectively.

It is seen that a large contact surface and hence a low series resistance is achieved between the cathode lead 7 and the cathode electrode owing to the fact that the capacitor element 1 and the plate 3 have plane contact surfaces. Furthermore, the width and length dimensions of the capacitor element 1 and hence the magnitude of the capacitance can be varied within limits without requiring the punching of the copper strip 5 to be adjusted to new dimensions. In this case a condition to be fulfilled is that the plate 3 shall have a surface at least that large as the opposed surface of the capacitor element 1.

FIGS. 4 and 5 show a front view and a top view respectively of the completed electrolytic capacitor, the leads 7 and 8 of which are formed by punching the copper strip 5, and the front surface of plastic casing 6 being provided with marking of the capacitance and maximal working voltage. The top of the plastic casing 6 has a recess 9 above the anode lead to make it easy to identify when the electrolytic capacitor is assembled.

We claim:

1. An electrolytic capacitor comprising an anode body of tantalum in the form of a parallelepiped having six rectangular and planar surfaces, one of said surfaces being covered with a dielectric layer, a planar cathode layer of conductive material covering said dielectric layer, a wirelike anode conductor of the same material as said anode body extending outward from the central portion of another of said surfaces which is perpendicular to said one planar surface, the axis of said wirelike anode conductor being perpendicular to said other surface, an anode lead and a cathode lead both having a laminar configuration, said anode lead being connected to said wirelike anode conductor, in such a way that the plane defined by said wirelike anode conductor and said anode lead lie in a plane parallel to the plane of said one planar surface and the axis of said wirelike anode conductor is orthogonal to the axis of said anode lead, said cathode lead being bent into three sections wherein the first and second outer sections are mutually parallel and the intermediate section making angles therewith, said first outer section being coplanar with said anode lead and said second outer section being coplanar with and affixed to said one planar surface of said anode body.

* * * * *